United States Patent
Shimizu

(10) Patent No.: US 8,288,978 B2
(45) Date of Patent: Oct. 16, 2012

(54) MOTOR DRIVER

(75) Inventor: Fumihiro Shimizu, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 372 days.

(21) Appl. No.: 12/588,902

(22) Filed: Nov. 2, 2009

(65) Prior Publication Data

US 2010/0117576 A1    May 13, 2010

(30) Foreign Application Priority Data

Nov. 10, 2008   (JP) .................................. 2008-287875

(51) Int. Cl.
*H02P 31/00*   (2006.01)
(52) U.S. Cl. ............... 318/400.26; 318/400.01; 318/700; 318/727; 318/767; 318/807
(58) Field of Classification Search ............. 318/400.26, 318/400.01, 700, 727, 767, 807
See application file for complete search history.

(56) References Cited

U.S. PATENT DOCUMENTS

| | | | | |
|---|---|---|---|---|
| 5,450,306 | A | * | 9/1995 | Garces et al. .................... 363/41 |
| 5,903,128 | A | * | 5/1999 | Sakakibara et al. .......... 318/721 |
| 6,687,139 | B2 | * | 2/2004 | Tanikawa et al. ............... 363/37 |
| 7,471,526 | B2 | * | 12/2008 | Welchko et al. ................ 363/41 |

FOREIGN PATENT DOCUMENTS

| | | |
|---|---|---|
| JP | 07-241095 | 9/1995 |
| JP | 2006-129663 | 5/2006 |

* cited by examiner

*Primary Examiner* — Walter Benson
*Assistant Examiner* — David Luo
(74) *Attorney, Agent, or Firm* — Harness, Dickey & Pierce, P.L.C.

(57) ABSTRACT

A motor driver, including a bridge circuit including a switching element and a diode, connecting with a coil terminal of each phase of a polyphase motor; a modulator modulating a voltage value applied to the coil terminal of each phase such that a minimum voltage value applied thereto is zero; a PWM signal generator generating a PWM signal, based on the voltage value applied to each phase, which is modulated by the modulator; and a switching element drive signal generator generating a switching element drive signal to drive the switching signal, based on the PWM signal generated by the PWM signal generator.

11 Claims, 4 Drawing Sheets

PULSE WIDTH
BEFORE MODULATED :

APPLIED VOLTAGE WAVEFORM
(HEAVY LINE) Vum
CARRIER WAVE (THIN LINE)

PULSE WIDTH
AFTER MODULATED :

APPLIED VOLTAGE WAVEFORM Uon

Uon : Hi

Uon : Lo

Uon : Hi

Uon : Lo

MOTOR DRIVER

BACKGROUND OF THE INVENTION

1. Field of the Invention

The present invention relates to a motor driver for driving a polyphase motor by applying a pulse-width-modulated voltage to a coil terminal of the motor to supply a drive current to the motor coil.

2. Discussion of the Related Art

In the field of household electrical appliance, office automation equipment and electric motor drive for driving vehicle, commutatorless motors commutating with an electric circuit using a switching element such as brushless motors and induction motors are widely used. Japanese published unexamined application No. 7-241095 discloses a method of applying a voltage having a predetermined phase difference to each coil terminal according to a basic waveform, an electric angle and a voltage magnitude by setting the basic waveform of the applied voltage such that the applied voltage to a phase is constantly zero for the purpose of reducing the applied voltage peak in the drive circuit and the switching loss. Further, when controlling speed by vector control method, the method disclosed in Japanese published unexamined application No. 7-241095 cannot be used because the applied voltage of each phase does not have a fixed phase difference. However, Japanese published unexamined application No. 2006-129663 discloses a method having an effect equivalent to that of Japanese published unexamined application No. 7-241095 by selectively switching a phase pausing switching with a phase of the applied voltage vector in a fixed coordinate system of orthogonal two axes, obtained from a control arithmetic and a axis transformation.

The method of Japanese published unexamined application No. 7-241095 applying a voltage having a predetermined phase difference among phases in accordance with a basic waveform cannot be used when the voltage applied to each phase does not have a phase difference.

As Japanese published unexamined application No. 2006-129663, when forming a speed control loop by controlling vector, plural multiplications and size comparison are needed to determine a phase to pause switching against a phase of the applied voltage vector in a fixed coordinate system of orthogonal two axes and separate the vector. Therefore, it takes a long time to compute when realizing a modulator on a processor with a software and a circuit size is large when realizing with a digital circuit. As for the control method of having no predetermined phase difference among each phase and not computing an applied voltage vector in the process of control computation, a biaxial applied voltage vector is synthesized from an applied voltage value and a direction vector of each phase and a phase to pause switching is determined, resulting in a long compute time or a large circuit size.

Depending on the modulation method of the applied voltage, the electric power differs before and after the modulation, resulting in no modulation and different motor behavior.

Since the applied voltage modulation varies the applied voltage waveform, there is a section a current cannot be run through depending on a drive status of the switching element and a direction of the coil current.

Because of these reasons, a need exists for a motor drive circuit capable of lowering applied voltage peak and reducing switching loss without increasing compute time and digital circuit regardless of phase difference.

SUMMARY OF THE INVENTION

Accordingly, an object of the present invention is to provide a motor drive circuit capable of lowering applied voltage peak and reducing switching loss without increasing compute time and digital circuit regardless of phase difference.

To achieve such objects, the present invention contemplates the provision of a motor driver, comprising:

a bridge circuit comprising a switching element and a diode, configured to connect with a coil terminal of each phase of a polyphase motor;

a modulator configured to modulate a voltage value applied to the coil terminal of each phase such that a minimum voltage value applied thereto is zero;

a PWM signal generator configured to generate a PWM signal, based on the voltage value applied to each phase, which is modulated by the modulator; and a switching element drive signal generator configured to generate a switching element drive signal to drive the switching signal, based on the PWM signal generated by the PWM signal generator.

These and other objects, features and advantages of the present invention will become apparent upon consideration of the following description of the preferred embodiments of the present invention taken in conjunction with the accompanying drawings.

DESCRIPTION OF THE PREFERRED EMBODIMENTS

Generally, the present invention provides a motor drive circuit capable of lowering applied voltage peak and reducing switching loss without increasing compute time and digital circuit regardless of phase difference. Particularly, the present invention relates to a motor driver, comprising:

a bridge circuit comprising a switching element and a diode, configured to connect with a coil terminal of each phase of a polyphase motor;

a modulator configured to modulate a voltage value applied to the coil terminal of each phase such that a minimum voltage value applied thereto is zero;

a PWM signal generator configured to generate a PWM signal, based on the voltage value applied to each phase, which is modulated by the modulator; and a switching element drive signal generator configured to generate a switching element drive signal to drive the switching signal, based on the PWM signal generated by the PWM signal generator.

Figure 1:
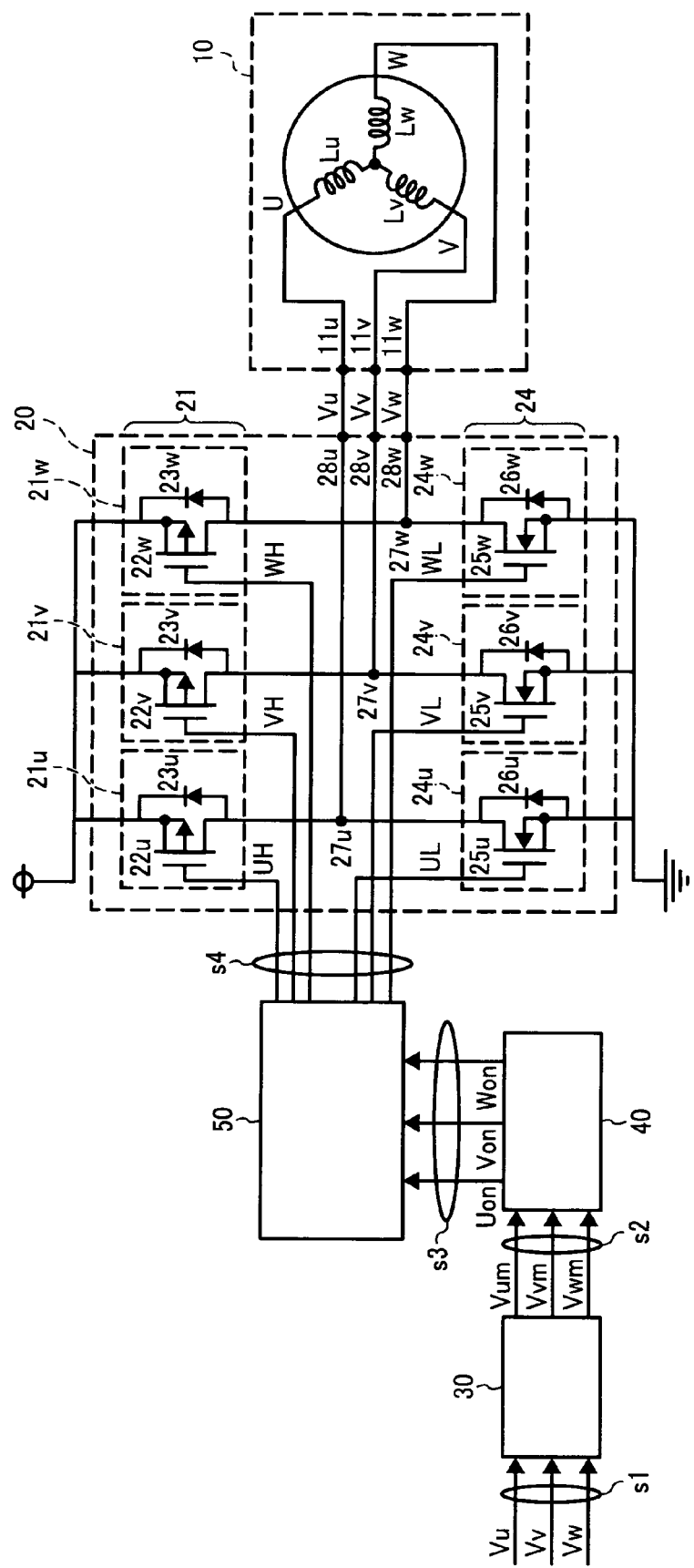
FIG. 1 is a schematic diagram of an embodiment of the present invention.

An embodiment of the present invention will be explained, referring to FIG. 1. FIG. 1 is a schematic diagram of the motor driver of the present invention.

A motor drive 1 driving a polyphase motor 10 includes transistors 22 and 25 as switching elements, a full bridge circuit 20 (bridge circuit) formed of diodes 23 and 26 and connected with coil terminals 11 (11$u$, 11$v$ and 11$w$) of the polyphase motor 10, a modulator 30 modulating applied voltage values such that a minimum applied voltage value to a phase is zero relating to a voltage signal s1 applied to the coil terminals 11$u$, 11$v$ and 11$w$ of each phase of the polyphase motor 10, a PWM signal generator 40 generating a PWM signal s3 based on a modulated voltage value s2 of each phase, and a switching element drive signal generator 50 generating a switching element drive signal s4 driving the transistors 22 and 25 of the bridge circuit 20.

The polyphase motor 10 has U phase, V phase and W phase, and is a Y-connection (star-connection) type three-phase motor in which coils Lu, Lv and Lw of each phase are connected at a point. The coil terminals 11$u$ of U phase, 11$v$ of V phase and 11$w$ of W phase are connected with output terminals 28$u$, 28$v$ and 28$w$ of the full bridge circuit 20, respectively.

The full bridge circuit 20 is formed of an upper arm 21 having the transistor 22 and the diode 23 parallely connected with the transistor 22, and a lower arm 24 having the transistor 25 and the diode 26 parallely connected with the transistor 25. The upper arm 21 and the lower arm 24 are bridge connected with each other at a connection point 27. Transistors 22$u$, 22$v$, 22$w$, 25$u$, 25$v$ and 25$w$ are respectively driven by UH, VH, WH, UL, VL, and WL of the switching element drive signal s4 which is an output of the switching element drive signal generator 50, and provide a drive current I (iu, iv and iw) to the coils Lu, Lv and lw of the polyphase motor 10 to drive the polyphase motor 10 to rotate.

Applied voltage value V (Vu, Vv and Vw) is computed by a control calculator (not shown) based on a rotation number of the rotor of the polyphase motor 10, which is detected by a rotation number detector (not shown) such that the rotor rotates at a constant speed.

The modulator 30 modulates the applied voltage value s1 such that a minimum voltage value is zero, relating to the Vu, Vv and Vw applied to the coil terminals 11$u$, 11$v$ and 11$w$, respectively of each phase.

The modulation of the applied voltage and the modulator 30 of the present invention will be explained. * represents Scala's multiplication, T represents a vector or a transpose of matrix, m represents a following unit matrix and (j×k) represents a matrix size of I row and k column (k=1).

First, the modulation of the present invention will be explained, using the following formulae (1) to (6). Vectors v, vm and i are the applied voltage value, the applied voltage value (after modulated) and the coil current value of each of the U phase, v phase and W phase as defined by the following formula (1).

$$v = \begin{bmatrix} Vu \\ Vv \\ Vw \end{bmatrix}, vm = \begin{bmatrix} Vum \\ Vvm \\ Vwm \end{bmatrix}, i = \begin{bmatrix} iu \\ iv \\ iw \end{bmatrix} \ldots 式(1) \qquad (1)$$

Figure 2:
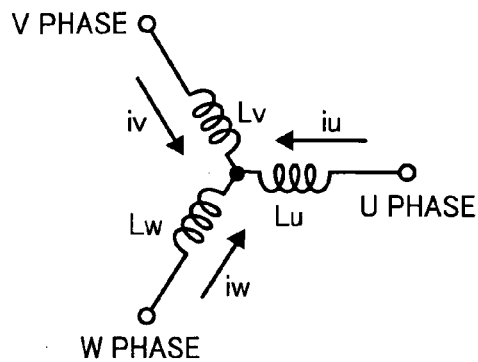
FIG. 2 is a schematic diagram illustrating positive directions of motor coil and current.

However, since the polyphase motor 10 of the present invention is Y (star-connection), the coil current values for each phase iu, iv and iw satisfy the following formula (2) when the arrow direction in FIG. 2 is a positive direction.

$$iu + iv + iw = 0 \qquad (2)$$

Next, when the applied voltage value vector v and the applied voltage value vector (after modulated) vm satisfy the following relationship (3):

$$vm = Tv \qquad (3)$$

T is a conversion matrix. The conversion matrix T varies according to the magnitude relations among applied voltage values (Vu, Vv and Vw) of the three phases. When Vu is minimum, the conversion matrix T is T1 having the following formula (4)-1.

$$T1 = \begin{bmatrix} 0 & 0 & 0 \\ -1 & 1 & 0 \\ -1 & 0 & 1 \end{bmatrix} \qquad (4)\text{-}1$$

When Vv is minimum, the conversion matrix T is T2 having the following formula (4)-2.

$$T2 = \begin{bmatrix} 1 & -1 & 0 \\ 0 & 0 & 0 \\ 0 & -1 & 1 \end{bmatrix} \qquad (4)\text{-}2$$

When Vw is minimum, the conversion matrix T is T3 having the following formula (4)-3.

$$T3 = \begin{bmatrix} 1 & 0 & -1 \\ 0 & 1 & -1 \\ 0 & 0 & 0 \end{bmatrix} \qquad (4)\text{-}3$$

However, when two phases have equivalent and minimum applied voltage values, either of the conversion matrices T may be used. Either of the conversion matrices produces the same result.

When W phase has the minimum applied voltage value, that the motor electric power is equal before and after modulated will be explained. The motor electric power is the sum of the values coming from multiplying the applied voltage value by the coil current value of each phase. The motor electric power when not modulated can be represented by the following formula (5) using the formula (2).

$$v^T i = \begin{bmatrix} Vu \\ Vv \\ Vw \end{bmatrix}^T \begin{bmatrix} iu \\ iv \\ -iu - iv \end{bmatrix} = Vu * iu + Vv * iv + Vw * (-iu - iv) \qquad (5)$$

Next, the motor electric power after modulated can be represented by the following formula (6) using the formula (3).

$$vm^T i = v^T T^T i = \qquad (6)$$
$$\begin{bmatrix} Vu \\ Vv \\ Vw \end{bmatrix}^T \begin{bmatrix} 1 & 0 & -1 \\ 0 & 1 & -1 \\ 0 & 0 & 0 \end{bmatrix}^T \begin{bmatrix} iu \\ iv \\ iw \end{bmatrix} = Vu * iu + Vv * iv + Vw * (-iu - iv)$$

The modulation method of the present invention produces an equivalent electric power before and after modulated.

Figure 3:
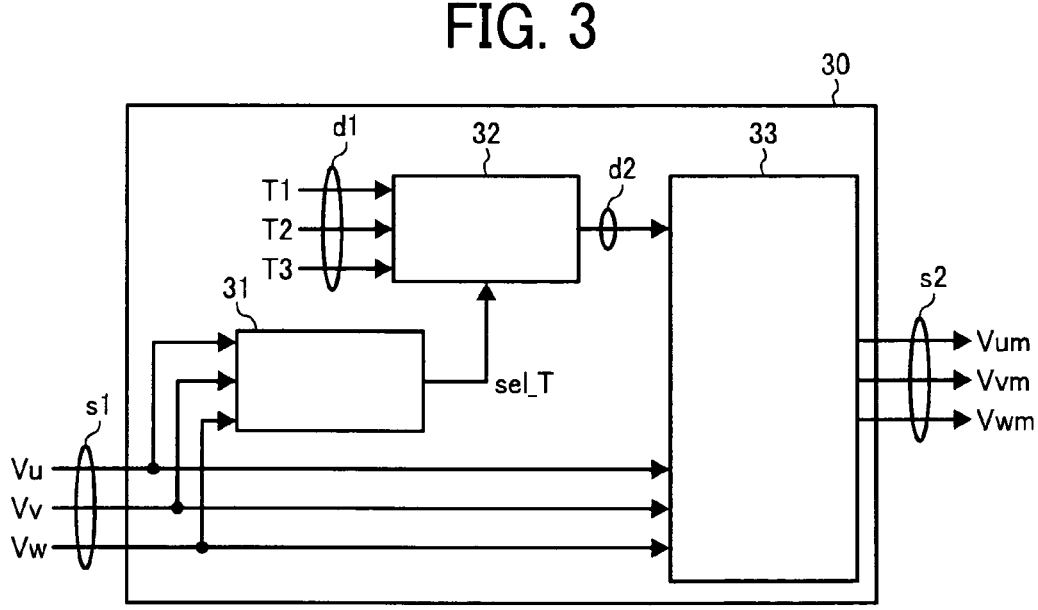
FIG. 3 is a circuit diagram illustrating an embodiment of the modulator of the present invention.

Next, the configuration of the modulator 30 will be explained, using FIG. 3. FIG. 3 is a circuit diagram illustrating a configuration of the modulator 30.

The modulator 30 includes a phase having minimum voltage determiner 31 determining a phase having a minimum voltage value from the applied voltage signal s1, a conversion matrix selector 32 selecting a conversion matrix based on the determination of the phase having minimum voltage determiner 31 and a conversion computer 33 modulating the applied voltage values Vu, Vv and Vw based on the conversion matrix selected by the conversion matrix selector 32.

The phase having minimum voltage determiner 31 determines a phase having a minimum voltage value (herein after referred to as a "zero phase") among Vu, Vv and Vw obtained from the applied voltage signal s1, and produces a zero phase selection signal sel_T showing which phase is a zero phase. However, when two zero phases are present, one of them is determined as a zero phase.

The conversion matrix selector 32 selects one from conversion matrix data d1 (T1, T2 and T3), and produces a conversion matrix (after selected) d2. Based on the zero phase selection signal sel_T, T1 is selected when the U phase is a zero phase, T2 is selected when the V phase is a zero phase, and T3 is selected when the W phase is a zero phase. The conversion matrix data T1, T2 and T3 are data indicating matrices of (4)-1, (4)-2 and (4)-3, respectively. Finally, the conversion computer 33 executes the conversion computation shown by the formula (3) relating to the applied voltage values Vu, vv and Vw obtained from the applied voltage value s1, and the conversion matrix T obtained from the conversion matrix (after selected) d2 to produce computed results Vum, Vvm and Vwm as the applied voltage value signal (after modulated) s2. Thus, the applied voltage is modulated.

The above-mentioned modulation method is for a three-phase motor, and the conversion matrix T for a m-phase motor is shown by the following formula (7).

$$v : (m \times 1), \ vm : (m \times 1), \ T : (m \times m) \quad (7)$$

$$T = I(m) - \begin{bmatrix} 0 & \cdots & 0 & 1 & 0 & \cdots & 0 \\ \vdots & \ddots & \vdots & \vdots & \vdots & \ddots & \vdots \\ 0 & \cdots & 0 & 1 & 0 & \cdots & 0 \end{bmatrix}_{n-row} (1 \le n \le m)$$

The right side of the formula (7) matrices in which n-row elements are all 1 and other elements are all zero are subtracted from a m-dimensional unit matrix I (m). As shown by the following formula (8), a n-th element (applied voltage to phase) is a minimum in the applied voltage vector v.

$$v = [V1, V2, \ldots, Vm]^T, \min\{Vi | i=1, 2, \ldots m\} = Vn \quad (8)$$

As mentioned above, the applied voltage modulation method of the present invention is performed by only size comparison and subtraction. The motor electric power is equivalent before and after the applied voltage is modulated, and the coil current is equivalent when the applied voltage is modulated or not.

Figure 4:
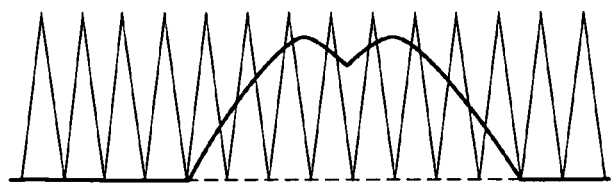
FIG. 4 is a schematic diagram illustrating the PWM modulation of the present invention.
Figure 4:
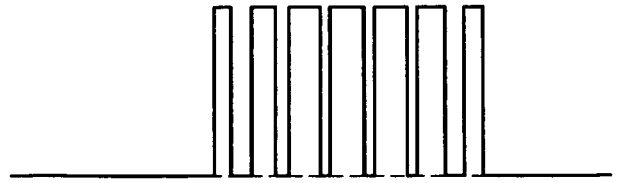

The operation of the PWM signal generator 40 will be explained, using FIG. 4. FIG. 4 is a schematic diagram illustrating the PWM modulation. FIG. 4 only shows the U phase as an example. The size of the applied voltage value Vum is compared with that of a triangle wave (carrier wave) as shown in an upper stage of FIG. 4 to produce a pulse-width-modulated PWM signal Uon as shown in a lower stage thereof. This is same for the other 2 phases.

Figure 5:
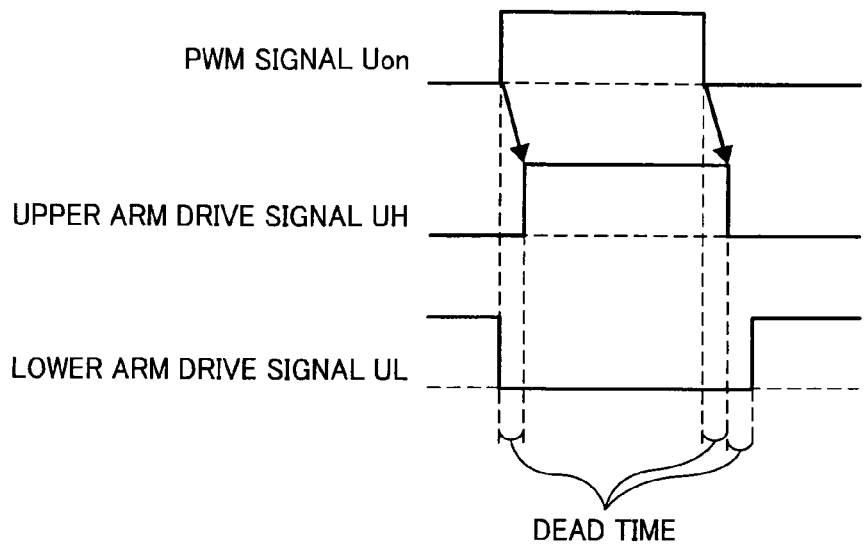
FIG. 5 is a schematic diagram illustrating a relationship between the PWM signal and the switching element drive signal of the present invention.

The operation of the switching element drive signal generator 50 will be explained, using FIG. 5. FIG. 5 is a schematic diagram illustrating a relationship between the PWM signal and the switching element drive signal produced by the switching element drive signal generator 50. FIG. 5 only shows the U phase as an example.

A signal delayed for predetermined dead time relative to the PWM signal Uon of the U phase is produced as the switching element drive signal UH of the upper arm 21u. Next, the switching element drive signal UL of the lower arm 24u changes to Lo when the PWM signal Uon of the U phase becomes Hi, and becomes Hi after an interval of twice as much as the predetermined dead time when the Uon changes again to Lo. As mentioned above, the transistor 22 of the upper arm 21 and the transistor 25 of the lower arm 24 are subsidiarily driven.

The dead time is for protecting the transistors 22 and 25 from being destroyed by a possible penetration current when they are on at the same time. This is same for the other 2 phases.

Figure 6A:
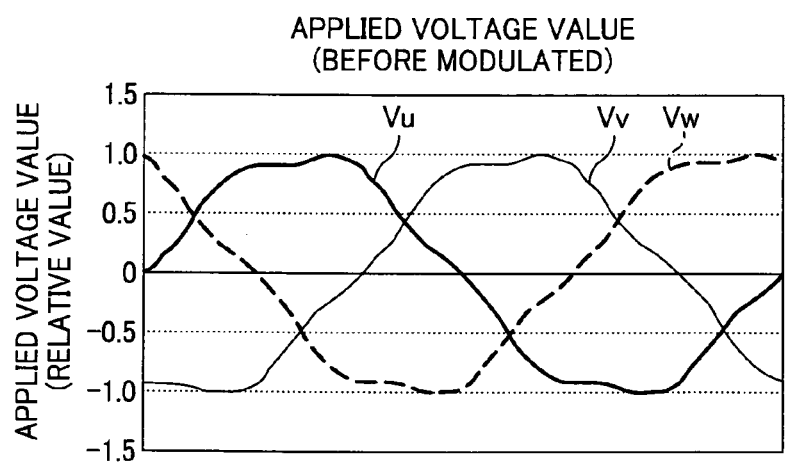
FIGS. 6A and 6B are schematic diagrams each illustrating an embodiment of waveform of applied voltage value before and after modulated.
Figure 6B:
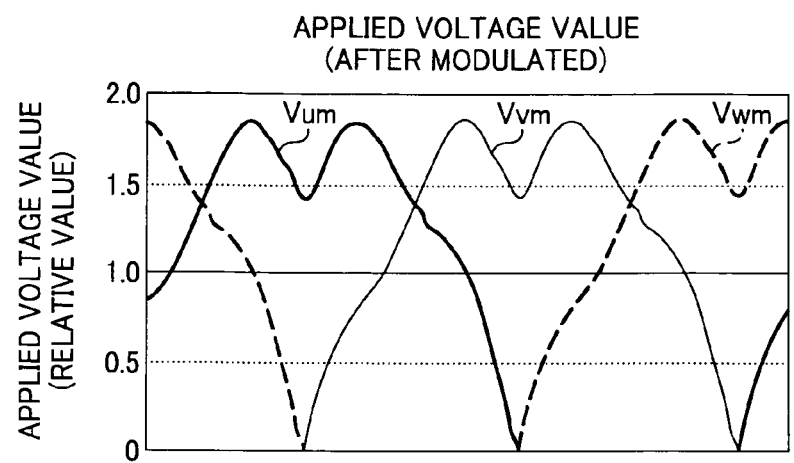

Next, the drive method and current direction of the switching element will be explained, using FIG. 6 and the formula (4). FIGS. 6A and 6B are schematic diagrams illustrating an embodiment of waveform of applied voltage value before and after modulated, respectively. As FIG. 6 and the formulae (4)-1 to (4)-3 show, the three-phase applied voltage value is definitely 0 or more, i.e., positive, after modulated in the present invention. Meanwhile, since the coil current of the motor varies like an AC, a current dead zone is formed relative to the applied voltage unless currents cannot be passed in both of the positive and negative direction of a coil L relative to a positive applied voltage value.

Suppose the switching element of the upper arm is on when the applied voltage value is positive and the switching element of the lower arm is on when the applied voltage value is negative. When the applied voltage is positive and the current flows in a negative direction (the neutral direction is positive as shown in FIG. 2), the current route is constantly in the electric power direction and a current in a negative direction iu inconveniently does not flow.

The U phase is specifically explained as an example. Suppose the U phase has a positive applied voltage value and a current iu flows through a coil Lu in a negative direction.

The route of a current from the polyphase motor 10 depends on ON•OFF of the transistors 22u and 25u, and the ON•OFF of the transistors 22u and 25u depends on Hi•Lo of a PWM signal which is the PWM-modulated applied voltage value. In this example, the transistor 22u of the upper arm is ON at an interval in which the PWM signal based on the positive applied voltage value is Hi, and both of the transistors 22u and 25u are OFF at an interval in which the PWM signal based on the positive applied voltage value is Lo. When the PWM signal is Hi, the route the current iu in a negative direction can pass through is only a route in the direction of an electric power through the transistor 22u. When the PWM signal is Lo, the route the current iu in a negative direction can pass through is only a route in the direction of an electric power through the diode 23u. Namely, whenever the applied voltage value is positive, the route of a current in a negative direction is only a direction for the electric power.

When the current route is in the direction of an electric power, the current in a negative direction does not flow because the applied voltage value of the other phase cannot be larger than the electric power voltage. When the polyphase motor 10 abruptly decelerates, a reverse voltage generated in the coil L is likely to flow a current in a negative direction. However, the current in negative direction is not flown because the reverse voltage is not larger than the electric power voltage except that the polyphase motor 10 is rotated with an external force at a rotation number larger than a maximum rotation number determined by an electric power voltage of the full bridge circuit 20 and properties of the polyphase motor 10.

Namely, the above-mentioned switching element drive method cannot flow a current iu in a negative direction because a route of the current in a negative direction is unexceptionally connected so as to go for a direction of higher voltage when the applied voltage value is positive. However, although the current in a negative direction flows for an electric power direction because the current direction does not instantly change right after switching due to an effect of coil inductance, the current decreases to zero in a short time or the current direction reverses.

The complementary drive and current direction of the switching element of the present invention will be explained, using FIGS. 7 and 8. FIGS. 7 and 8 are schematic diagrams illustrating the upper arm 21*u* and lower arm 24*u* of the U phase of the full bridge circuit 20, and the coil Lu of the polyphase motor 10.

Figure 7A:
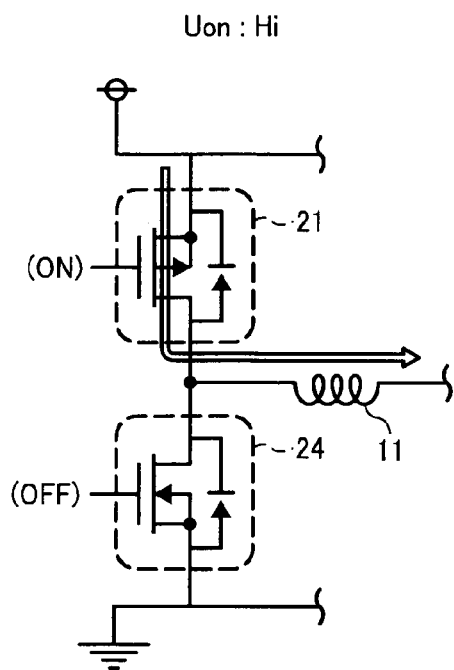
FIGS. 7A and 7B are schematic diagrams each illustrating a current route (only U phase) when a coil current flows in a positive direction.
Figure 7B:
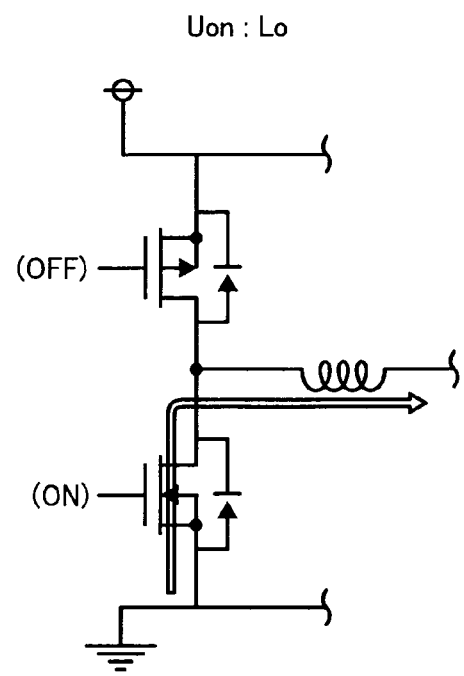

FIG. 7 illustrates a case where a current in a positive direction flows. FIG. 7A illustrates a case where the PWM signal Uon is Hi, and 7B illustrates a case where the PWM signal. Uon is Lo. The dead time interval is not illustrated. In FIG. 7A, a current flows from an electric power to the motor coil Lu. In FIG. 7B, the current circulates in the full bridge circuit 20 and the motor coil Lu.

Figure 8A:
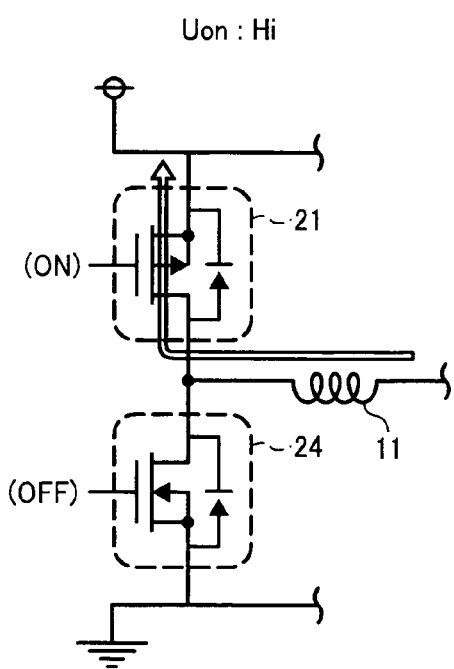
FIGS. 8A and 8B are schematic diagrams each illustrating a current route (only U phase) when a coil current flows in a negative direction.
Figure 8B:
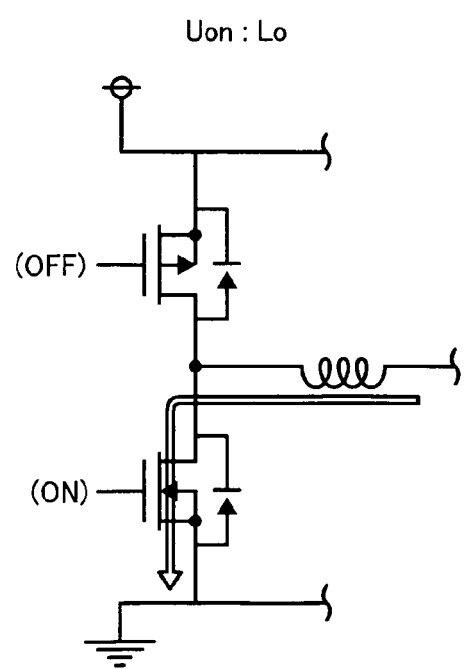

FIG. 8 illustrates a case where a current in a negative direction flows. As shown in FIG. 7, FIG. 8A illustrates a case where the PWM signal Uon is Hi, and 8B illustrates a case where the PWM signal Uon is Lo. As shown in FIG. 7, the dead time interval is not illustrated. In FIG. 8A, a current flows to an electric power. In FIG. 8B, the current flows to a GND or circulates in the full bridge circuit 20 and the motor coil Lu. Namely, even when the applied voltage value is a current in a positive and a negative direction, a current in a negative direction can flow because the current route is not for an electric power direction if the PWM signal Uon is Lo.

In the present invention, the applied voltage value is unexceptionally modulated to be zero or more, and a current to be flown through the coil for rotating the motor is an alternation current alternating to positive and negative directions. Therefore, the drive method of the present invention can flow the alternation current because of being capable of flowing a current in positive and negative directions even when the applied voltage value is positive.

The U phase has been explained, and V and W phases are same.

In the present invention, when the applied voltage value is modulated such that a phase having a minimum voltage value has an applied voltage value of zero, at least one phase can reduce an applied voltage peak and a switching loss as a switching pause. Further, the interphase voltage can have a larger saturated value. Since the modulation means is realized by a simple calculation, the calculation time can be reduced when a software on a processor realizes, and a circuit size can be downsized when a digital circuit realizes.

Further, when the applied voltage value is modulated such that the motor has an equivalent electric power before and after modulated, the coil current value and the rotor behavior are equal to those in a case where the applied voltage is not modulated. When the switching elements of the upper and lower arms of each phase in a full bridge circuit are complementarily driven, a dead zone of a coil current relative to the applied voltage value can be avoided.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2008-287875 filed on Nov. 10, 2008, the entire contents of which are herein incorporated by reference.

What is claimed is:

1. A motor driver, comprising:
   a bridge circuit comprising a switching element and a diode, configured to connect with a coil terminal of each phase of a polyphase motor;
   a modulator configured to modulate a first voltage value of each phase to generate a second voltage value of each phase such that a minimum voltage value of the second voltage value is zero;
   a PWM signal generator configured to generate a PWM signal, based on the second voltage value applied to each phase; and
   a switching element drive signal generator configured to generate a switching element drive signal to drive the switching signal, based on the PWM signal generated by the PWM signal generator.

2. The motor driver of claim 1, wherein the modulator comprises:
   a voltage minimum phase determiner configured to determine a voltage minimum phase from the first voltage value;
   a conversion matrix selector configured to select a conversion matrix, based on a determination result of the voltage minimum phase determiner; and
   a conversion computer configured to modulate the first voltage value with the conversion matrix selected by the conversion matrix selector.

3. The motor driver of claim 1, wherein the modulator modulates the first voltage value such that a motor power before and after modulated are equal.

4. The motor driver of claim 1, wherein the modulator reduces the first voltage value of the voltage minimum phase from first voltage values of the other phases.

5. The motor driver of claim 1, wherein the bridge circuit is a full bridge circuit comprising an upper arm and a lower arm, and wherein the switching element drive signal generator generates a switching element drive signal to complementarily drive a switching element of the upper arm and that of the lower arm of each phase.

6. The motor driver of claim 5, wherein the switching element drive signal has a dead time so as not to make the switching element of the upper arm and that of the lower arm on at the same time.

7. A motor driver, comprising:
   a bridge circuit comprising a switching element and a diode, configured to connect with a coil terminal of each phase of a polyphase motor;
   a modulator configured to modulate a voltage value applied to the coil terminal of each phase such that a minimum voltage value applied thereto is zero, the modulator including:

a voltage minimum phase determiner configured to determine a voltage minimum phase from the voltage value, a conversion matrix selector configured to select a conversion matrix, based on a determination result of the voltage minimum phase determiner, and a conversion computer configured to modulate the voltage value with the conversion matrix selected by the conversion matrix selector;

a PWM signal generator configured to generate a PWM signal, based on the voltage value applied to each phase, which is modulated by the modulator; and a switching element drive signal generator configured to generate a switching element drive signal to drive the switching signal, based on the PWM signal generated by the PWM signal generator.

8. The motor driver of claim 7, wherein the modulator modulates the voltage value such that a motor power before and after modulated are equal.

9. The motor driver of claim 7, wherein the modulator reduces the voltage value of the voltage minimum phase from voltage values of the other phases.

10. The motor driver of claim 7, wherein the bridge circuit is a full bridge circuit comprising an upper arm and a lower arm, and wherein the switching element drive signal generator generates a switching element drive signal to complementarily drive a switching element of the upper arm and that of the lower arm of each phase.

11. The motor driver of claim 10, wherein the switching element drive signal has a dead time so as not to make the switching element of the upper arm and that of the lower arm on at the same time.

* * * * *